United States Patent [19]

Hill

[11] Patent Number: 5,348,661

[45] Date of Patent: Sep. 20, 1994

[54] OIL ABSORPTION METHOD AND APPARATUS UTILIZING A REPLACEABLE BLADDER

[76] Inventor: Alan Hill, P.O. Box 11, Hermosa Beach, Calif. 90254

[21] Appl. No.: 858,249

[22] Filed: Mar. 25, 1992

Related U.S. Application Data

[63] Continuation-in-part of Ser. No. 594,045, Oct. 9, 1990, abandoned.

[51] Int. Cl.$^5$ .............................................. C02F 1/28
[52] U.S. Cl. .................................... 210/680; 210/691; 210/242.4; 210/924
[58] Field of Search ............ 210/680, 691, 693, 242.4, 210/282, 924, 484; 405/63

[56] References Cited

U.S. PATENT DOCUMENTS

| | | | |
|---|---|---|---|
| 4,111,813 | 9/1978 | Preus | 210/282 |
| 4,497,712 | 2/1985 | Cowling | 210/691 |
| 4,752,393 | 6/1988 | Meyers | 405/63 |
| 4,919,820 | 4/1990 | Lafay et al. | 210/242.4 |

Primary Examiner—Ivars Cintins
Attorney, Agent, or Firm—John E. Halamka

[57] ABSTRACT

A method of removing hazardous fluid waste material from a body of water by exposing a carrier (10) containing a porous bladder (20) filled with sorbent material to the waste and then removing said carrier(10). The exposed bladder (20) may be removed from the carrier (10) for disposal of the waste. The carrier (10) may be recharged with a fresh bladder (20) and reused. An apparatus for removing hazardous fluid waste material having a carrier (10) for a porous bladder (20) filled with sorbent material such as waterfowl feathers. The carrier (10) is fabricated to allow the removal of an exposed bladder (20) and refilling with a fresh bladder (20) without removal of the apparatus from the surface of the water while still containing the pool of hazardous waste. The carrier (10) may be fabricated of flexible (40) or rigid (60) mesh material. An adhesive coating may be applied to the bladder (20) to aid in containment of the sorbent material within the bladder (20) especially during handling.

43 Claims, 3 Drawing Sheets

OIL ABSORPTION METHOD AND APPARATUS UTILIZING A REPLACEABLE BLADDER

This application is a continuation in part of U.S. patent application, Ser. No. 07/594,045, filed Oct. 9, 1990 by applicant Alan Hill, now abandoned.

BACKGROUND OF THE INVENTION

1. Field of the Invention

This invention relates generally to clean-up of hazardous fluid waste material including that containing oil or petroleum products, and removal of such hazardous fluid waste material from bodies of water, and more particularly, to the use of oleophilic sorbent material such as waterfowl feathers contained in or formed as a porous bladder and insertably removable from within a reusable mesh carrier apparatus or a carrier formed without the mesh in which the sorbent material is held together with adhesive.

2. Description of the Prior Art

A U.S. Pat. No. 4,919,820 ('820) discloses a method of removing oil from a body of water by means of an apparatus constructed of flexible mesh container filled with duck feathers. Said apparatus, as a whole, being removably insertable into the contaminated water.

The apparatus disclosed in '820 worked well for the intended purpose of rapid removal of petroleum from water bodies after an oil spill, but it did require some storage space for the apparatus. Further, for the apparatus to be reused, the entire apparatus had to be removed from the body of water, routed through a device to squeeze out the absorbed oil and then reinserted into the body of water. During the time the apparatus was out of the water, the oil slick was unconfined and could spread. '820 attempted to solve this problem by providing a second apparatus parallel to the first apparatus which would confine the oil slick while the first apparatus was being removed. The first apparatus would then be reinserted into the water behind the second apparatus a difficult feat of topology if performed from a small service boat.

Further, the disposal of the entire '820 apparatus continues to be an unsolved problem in view of the considerable size of the used apparatus saturated with oil and having a percentage of the apparatus which may be composed of non-biodegradable material such as fiber glass mesh coated with polyvinyl resin. The used '820 apparatus could present a toxic waste disposal problem of a different character.

The object of the present invention is to increase the convenience, versatility, and provide a solution to the disposal problem presented by the '820 apparatus.

The bladder taught by this invention could be removably inserted into the '820 boom to initially provide the sorbent material and when saturated replaced without removal of the entire '820 apparatus from the surface of the water. This will simplify the use of '820 and aid in eliminating the disposal problems.

Another U.S. patent, Ser. No. 4,752,393 ('393) provides an apparatus which forms a pathway to skim the hazardous material from the surface of the water while providing a surface boom and sub-surface curtain for containment. The '393 apparatus incorporates flotation material to provide the neutral buoyancy to the device. It further incorporates spring steel coils to maintain the boom in a spherical cross section configuration. Both the flotation material and the steel coils incorporated into the '393 device will be contaminated by the hazardous material and will present disposal problems.

Part of the '393 device may be used as the carrier for the bladder taught by this invention. The bladder taught by this invention could be removably inserted into the '393 boom to provide the cross section configuration and the required buoyancy while eliminating the above disposal problems of contaminated steel coils and flotation material.

Thus, there has long been a need for an arrangement to assist a user of containment booms by providing a reusable, replaceable sorbent to the boom deployed on the water and which may be safely serviced by a person in a boat on the water.

It is desired that this device be easy to store and easy to use at a moments notice.

It is further desired that the device not itself present a safety hazard to the user during replacement in the boom carrier apparatus such as either the '820 or the '393 apparatus.

It is yet further desired that the device itself not add to the accumulation of hazardous fluid waste.

SUMMARY OF THE INVENTION

Accordingly, it is an object of the present invention to provide a reusable, replaceable sorbent contained in a bladder for use in a carrier device.

It is another object of the present invention to provide a carrier device which forms a boom for containment of the hazardous waste while the sorbent in the bladder absorbs the waste.

It is another object of the present invention to provide a bladder device which is easy to store and easy to deploy.

It is yet another object of the present invention to provide a replaceable bladder device which is easy to install from a tender boat and which does not present a safety hazard to the user.

It is yet another object of the present invention to provide a bladder which replaces the sorbent in a boom device so that the accumulation of contaminated hazardous waste may be reduced.

The above and other objects of the present invention are achieved, according to a preferred embodiment thereof, by providing an apparatus consisting of a porous bladder containing oleophilic sorbent material and insertably removable from within a reusable carrier. The carrier may be fabricated of flexible or non-flexible mesh of a preselected grid size, The carrier may be fabricated of sorbent or non-sorbent material. The bladder may contain natural oleophilic sorbent material such as waterfowl feathers, or manufactured oil sorbents available from such sources as 3M Company. The bladder material is selected to be fabricated from oleophilic sorbent material yet admit the liquid hazardous waste material such as a water/petroleum mousse for absorption of the hazardous waste by the oleophilic sorbent material contained therein.

U.S. Pat. No. 4,919,820, teaches the use of waterfowl feathers in the preferred embodiment because such feathers do not absorb water but do absorb the oil or oil based waste.

The teaching of '820 to use waterfowl feathers is incorporated herein but greatly expanded with the use of a bladder to contain the feathers. The feather stuffed bladder may be inserted into a carrier such as the non-sorbent, polyvinyl coated fiber glass discussed in '820 or a formed carrier as discussed in '393.

The apparatus of the bladder and carrier may be formed as a boom to surround and aid in the containment of the spill while allowing the hazardous material containing oil or petroleum products to be absorbed. The used bladder may be removed from the carrier and a new bladder inserted. Or the entire apparatus may then be removed from the water, packaged for handling and removed to a disposal site.

The carrier in the preferred embodiment is fabricated from mesh as a series of individual cells. In another embodiment, the mesh is not used and the material is held together with biodegradable or non-biodegradable adhesive. Each cell contains a preselected amount of waterfowl feathers or other sorbent material. One seam of the mesh carrier may be constructed to be openably closeable. The waterfowl feathers may be prepackaged in a biodegradable mesh to be insertably removable from a cell. In another embodiment, the waterfowl feathers may be formed in essentially a porous brick held together by biodegradable or non-biodegradable adhesive. After the apparatus is exposed to the water-/oil mixture and removed, each cell is opened, the oil saturated, prepackaged waterfowl feather bladder is removed, a fresh prepackaged waterfowl bladder is inserted and the cell is closed. The recharged apparatus may be re-used and the process repeated.

Because sorbents such as waterfowl feathers float, the bladder filled apparatus my lie upon the upper surface of the oil/water mousse. The amount of contact with the mousse will increase as the feathers absorb oil, become heavier, and sink the apparatus below the surface of the mousse. However, this initial flotation configuration increases the time required to recover and control the oil spill.

A section of "lead line" may be attached along one seam of the apparatus to sink one edge. This configuration will increase the angle of attack between the surface of the mousse and the plane of the apparatus aiding in reducing the exposure time required to absorb and raising the opposite edge above the surface to form a fence to better contain the mousse.

If the bladder is used in a carrier similar to '393, the leading surface of '393 may be a mesh material and the trailing surface may be solid material. Thus, the bladder may be removed from a cell structure in '393 without letting the oil slick escape the containment of a single boom configuration of the '393 type carrier.

In another embodiment of the present invention, the bladder is shaped to be elongated and coupleable in series. The carrier is fabricated with closeable openings adjacent each end of the bladder. A fresh bladder is coupled to one end of an exposed bladder held in the carrier. The exposed bladder is removed from the carrier by the other end. The fresh bladder is pulled into the carrier as the exposed bladder is removed. This process of tending the boom may be done from a small boat next to the deployed boom.

In yet another embodiment, the carrier is fabricated from rigid mesh such as chain link fence or the like. The carrier is fabricated in attachable modules. Each module may be of a preselected length to provide a sub-surface barrier and an above surface barrier to the hazardous waste while deployed in a rough sea. Floats may be attached to the modules so that six feet of the module is beneath the surface and four feet rise above the surface. Each module contains cells to hold a plurality of bladders. The cells may be vertical and may have additional cells extending horizontally at the water line. The modules may be connected in series to form a boom.

The bladder may be fabricated of a mesh material or formed essentially as a porous brick held together by biodegradable or non-biodegradable adhesive. In one embodiment, the material is a fine mesh with a consistency much like muslin.

In yet another embodiment of the present invention, the bladder may be fabricated of a coarse mesh. In order to prevent bleeding of the sorbent through the bladder, after the bladder is filled with sorbent is is lightly sprayed with a water soluble adhesive. Containment of the sorbent within a larger mesh container will now be possible with the dual advantage of reducing the bulk of the containment mesh and controlling the loss of sorbent material during packing, handling and deploying the bladder.

In yet another embodiment, the mesh is eliminated and an adhesive spray is used to hold the sorbent material together during handling.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

DESCRIPTION OF A PREFERRED EMBODIMENT

Figure 1:
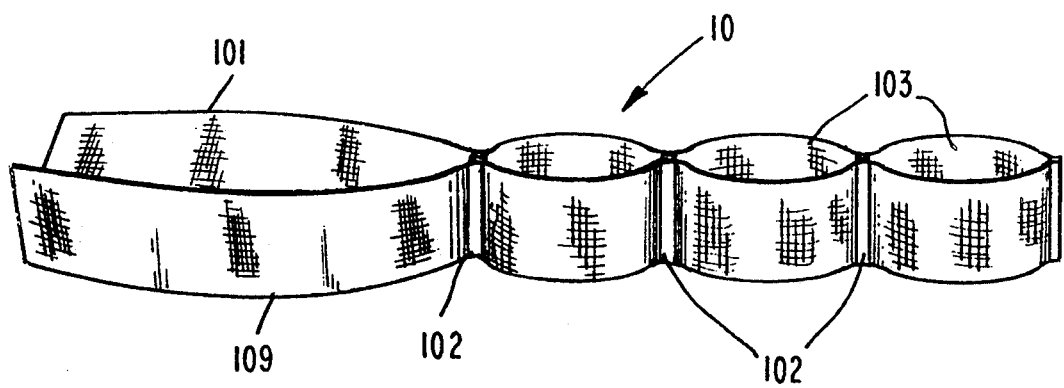
FIG. 1 is a perspective view of a carrier apparatus for the bladder.
Figure 3:
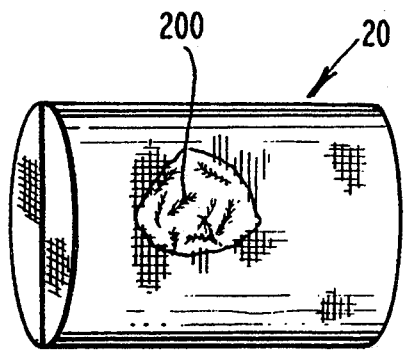
FIG. 3 is a perspective view of the bladder.

Now referring to the drawing, there is illustrated in FIG. 1 a perspective view of an outer carrier, generally designated 10, for a bladder, generally designated 20 in FIG. 3. FIG. 1 illustrates an elongated sheet 101 of woven or pressed flexible mesh material folded generally in half and may be heat sealed or similarly fastened at preselected intervals along a plurality of seams 102 generally perpendicular to the fold 109 to form a series of cells 103.

The sheet 101 may be made of ARLAND, the commercial, trademarked name for polyvinyl coated, woven fiber glass mesh. ARLAND is available in may different sized mesh and colors. The preferred embodiment is fabricated of bright orange colored ARLAND so that the resulting boom is easily visible on the surface of the water.

When hazardous materials, which may be petroleum based, are spilled into open water, the action of the wind and waves mixes the oil and water to create a mousse like substance.

Hazardous materials may be spilled within a contained area such as a warehouse or vessel. The method and apparatus taught by the invention may be used as a pad of a preselected number of cells filled with a bladder of sorbent material to absorb the hazardous materials.

The sheet 101 has a preselected size of mesh grid. The size should be small enough to contain the bladder filled with sorbent material such as waterfowl fathers yet allow the hazardous waste such as a mousse of water and petroleum to freely flow through the grid. The choice of mesh size will depend upon many environmental factors such as the ambient temperature, the type of hazardous fluid waste, etc. A mousse will increase in viscosity as the temperature is lowered. In the preferred embodiment, a mesh grid separation of approximately 1.5 millimeter contains the bladder yet allows the mousse to flow through the outer carrier 10. The mesh may be eliminated and replaced with a spray coating of adhesive.

Figure 2:
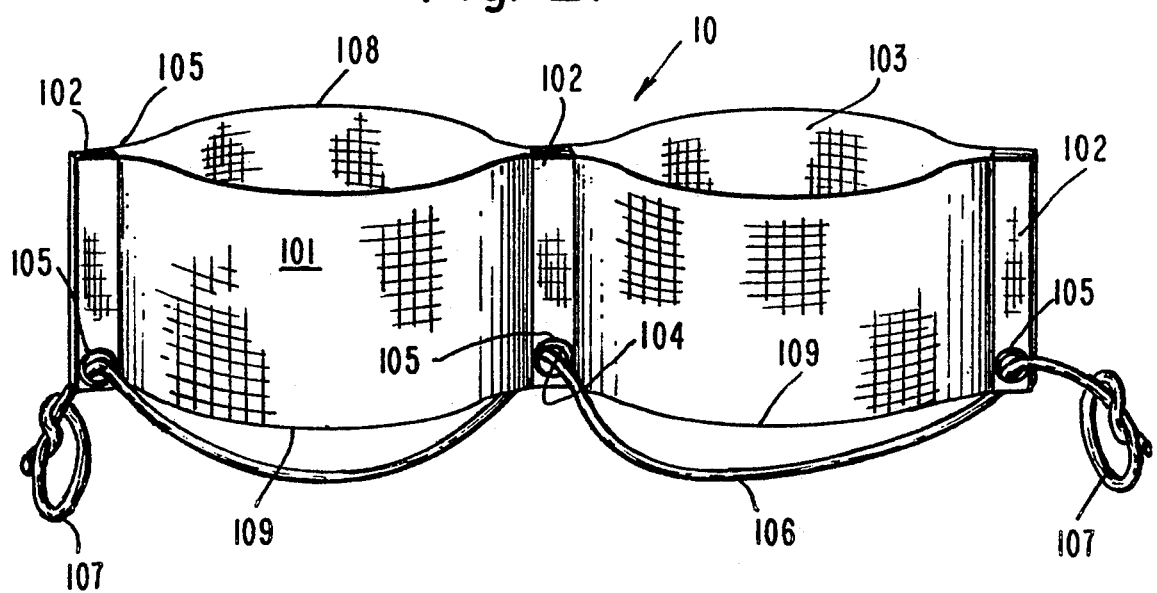
FIG. 2 is a perspective view of an assembled series of the carrier cells.

FIG. 2 illustrates a series of cells 103 with edges 104 forming apertures in the seam 102 near the fold line 109 of the sheet 101. Grommets 105 may be inserted into the edges 104. The grommets 105 should be made of non-metallic, non-corrosive material such as nylon. Weights may be mounted in or through the grommets 105.

In the preferred embodiment, a length of "lead line" 106 is threaded through the grommets 105. Exposed ends of the lead line 106 may be formed in a loop 107 so that sections of the arrangement 10 may be attached to form a long boom to surround and aid in the containment of the oil spill. The preferred attachment is to overlap the end cells of each section.

The lead line 106 will cause the folded edge 109 of the carrier 10 to sink below the top surface of the oil and water mixture.

The openable edge 108 of the carrier 10 will have a tendency to ride higher in the water thus changing the angle of attack of the carrier 10 from initially floating essentially flat on the surface of the mousse to being partially below the surface with the fold 109 edge submerged. This will increase the surface area of the carrier exposed to the oil and water mixture and aid in speeding the absorption of the hazardous waste by the sorbent. The tilted configuration will also aid in containment of the hazardous waste such as oil which has a tendency to slip under and be washed over a boom by wind and wave action.

FIG. 3 illustrates the prepackaged bladder generally designated 20. The bladder 20 is fabricated of a material preselected to contain the sorbent such as waterfowl feathers 200. It is desired that material such as cotton fish net, cotton muslin or other biodegradable substance be selected. As mentioned above, the fabric used to make the bladder should have warp and woof elements of the grid close enough to prevent the sorbent material such as waterfowl feathers from falling out. If too coarse a mesh is selected, the process of filling the bladder with waterfowl feathers under air stream pressure may result in too many feathers being blown out of the bladder. A fine mesh with a grid separation of 0.01 mm may be preferred to contain the 3M sorbent as well as the waterfowl feathers if the bladder is to be filled by blowing the feathers into the bladder.

Because this prepackaged bladder 20 will be inserted into the cells 103 of the outer carrier 10 before being exposed to the mousse, the grid material of bladder 20 should be strong enough to withstand heavy stress of being shoved or pulled into the cells.

The purpose of the bladder 20 is to allow the cells of the carrier 10 to be charged/recharged with sorbent material such as waterfowl feathers.

After the bladder is filled with sorbent, the outer surface of the bladder may be lightly spray coated with a water soluble, biodegradable or non-biodegradable adhesive to contain sorbent within the mesh and prevent bleeding of the sorbent in handling, packaging and deployment. An adhesive with a pitch base is available from Triangle Associates, Los Angeles, Calif. This adhesive is biodegradable and approved for use by the Environmental Protection Agency.

After being exposed to the mousse, the charge of oil impregnated sorbent material such as waterfowl feathers will readily adhere in mass with little assistance from the grid. It is this exposed mass which may be removed from the carrier 10 for disposal and possible post processing to recovery part of the spilled petroleum product. The carrier 10 may be re-used many times.

The openable edges 108 of the cells 103 may be closeable by such means as a chain stitched nylon thread, a nylon zipper or nylon snaps.

The closing means should be non-corrosive, non-sorbent material which is not clogged by the mousse.

The zipper or snaps should be capable of many cycles.

The nylon chain stitch allows the closing means to be easily removed and the edges re-sewn after the cells are re-charged with fresh sorbent material inside the bladder.

Figure 4:
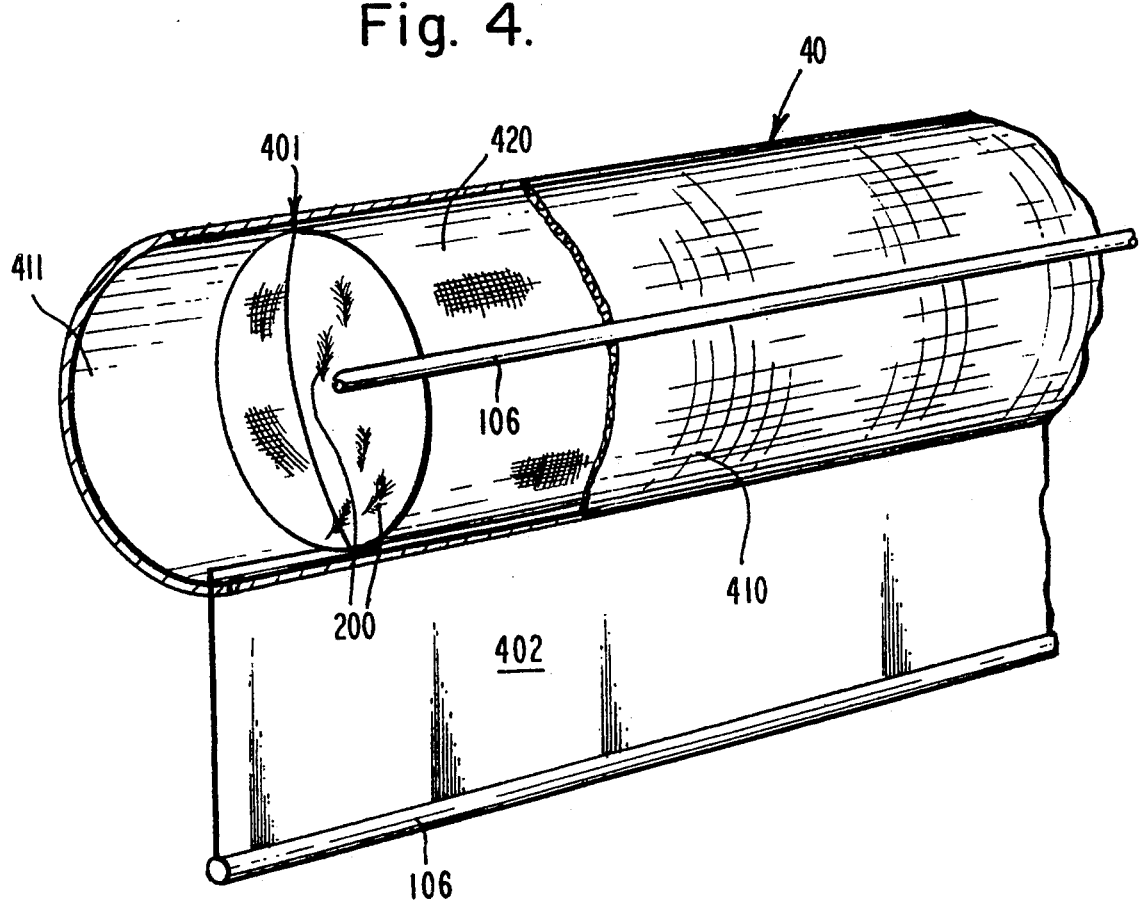
FIG. 4 is a perspective view of another embodiment of the carrier apparatus.

Now referring to FIG. 4, there is illustrated another carrier 40 fabricated in a shape similar to that taught by U.S. patent, Ser. No. 4,752,393, as modified according to the teachings of this invention.

The carrier 40 contains a body 401, generally circular or other preselected shape, forming a boom and a curtain 402 attached to the body 401. A length of lead line 106 may be mounted on the edge of the curtain 402 remote from the body 401 to deploy the curtain 402 in a vertical hanging configuration. This curtain 402 aids in the containment of the hazardous waste by containing the waste which would slip under the boom formed by the body 401.

The body 401 may be fabricated entirely of mesh material or just mesh material for the leading edge 410 and a solid sheet material for the trailing edge 411 of the boom. The carrier 40 is deployed with the leading edge 410 nearest the hazardous material.

A bladder 420 containing sorbent material is mounted inside the body 401.

The hazardous material may then flow through the leading edge 410 mesh to be absorbed by the bladder 420.

A second length of lead line 106 may be mounted on the lower segment of the leading edge 410 so that the leading edge 410 is pulled into the mousse contained by the boom. This will increase the area of the sorbent material exposed to the mousse and shorten the time required for the sorbent to fully absorb the maximum amount of hazardous material.

Figure 5:
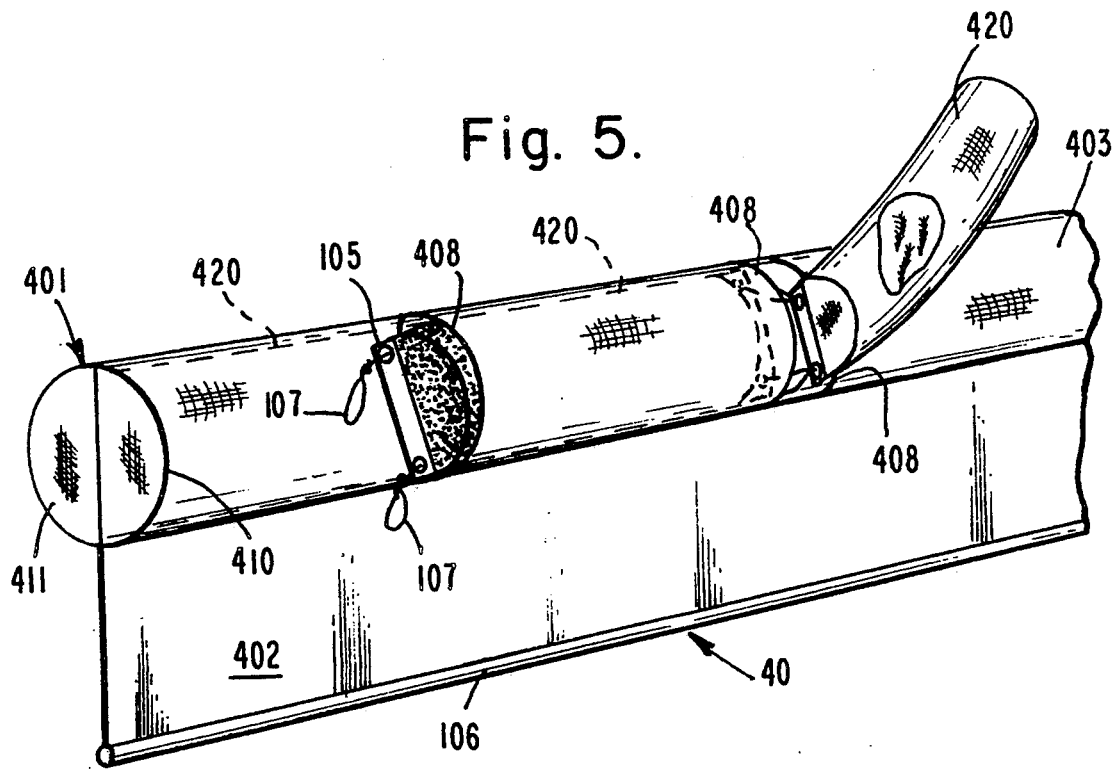
FIG. 5 is a perspective view of a assembled series of cells and replaceable bladder; and, FIG. 6 is a perspective view of another embodiment of a module carrier apparatus.

FIG. 5 illustrates the fabrication of the body 401 as a series of cells 403 with openable edges 408. After the carrier 40 is deployed and hazardous waste absorbed by the bladder 420, the user may open a edge 408 on one end of a cell 403, attach a fresh bladder 420 to the end of the exposed bladder 420. The user may then open the other edge 408 of the cell 403 to extract the exposed bladder 420 while pulling the fresh bladder 420 into the carrier 40. While the cell 403 is being recharged with a fresh bladder 420, the solid sheet material trailing edge 411 will contain the hazardous waste within the boom.

Figure 6:
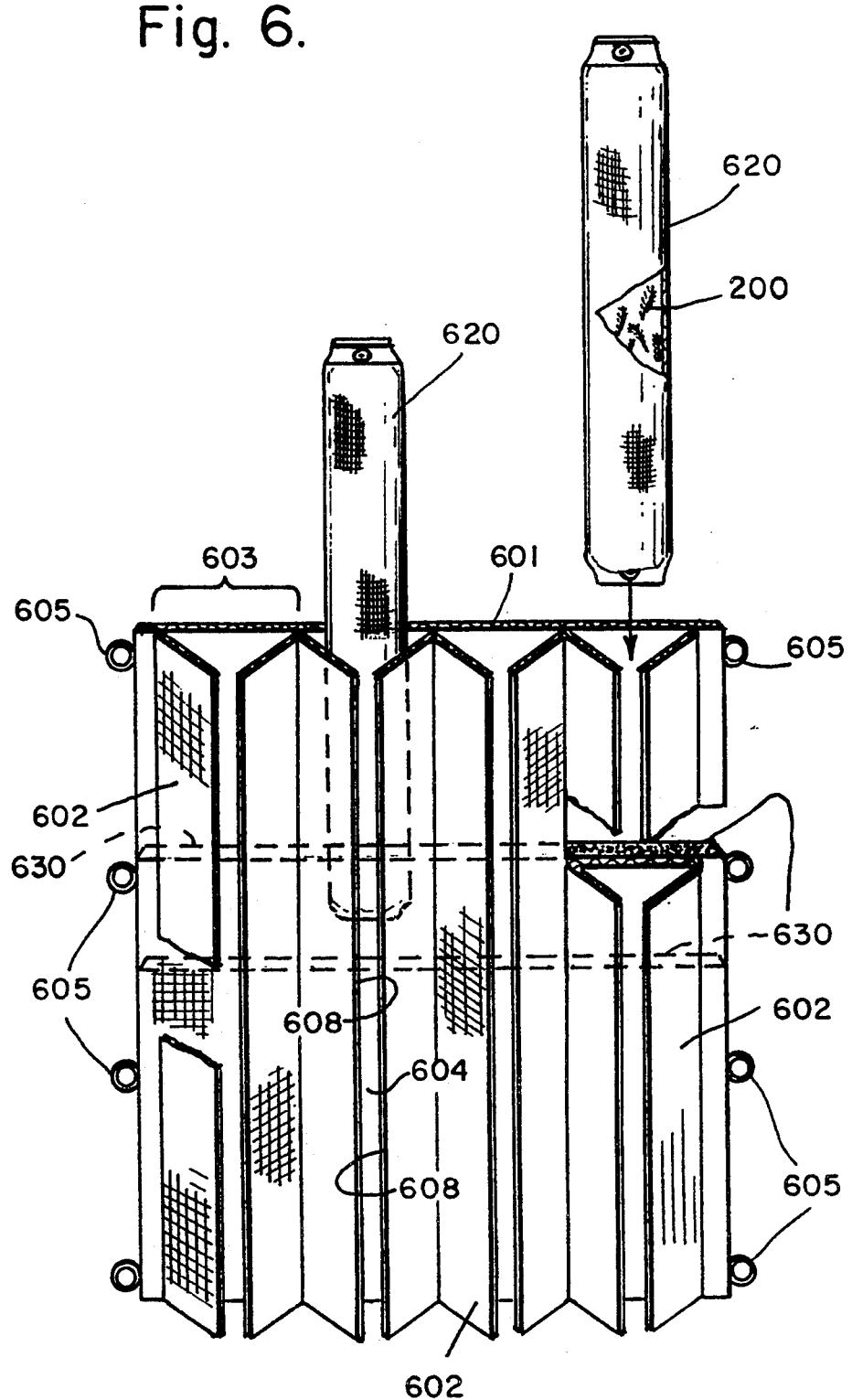

FIG. 6 illustrates yet another carrier embodiment 60 of the present invention fabricated of nonflexible mesh material. This carrier 60 is capable of being deployed in a rough sea environment. A ridged sheet of mesh material forms a back plane 601. A plurality of rigid mesh panels 602 are mounted at a preselected angle to the back plane 601 to form cells 603. The panels 602 form an open seam 604 between unattached open edges 608. The open seam will allow a tool to be attached to one end of the bladder 620, run down the length of the open edge 608 and then disconnected from the bladder 620 to install the bladder within the cell 603.

Floats 630 may be mounted on the cells 603 or on the back plane 601 to provide a neutral buoyancy with bladders 620 installed whereby the carrier 60 will ride with approximately ¾ of its vertical length under the surface with the remainder above the surface thereby forming a fence to contain the hazardous material. The mesh panels 602 allow the hazardous waste to come into contact with the sorbent within the bladders 620. The length of the back plane 601 in this embodiment is approximately 10 feet to allow the carrier 60 to form an effective fence for containment of hazardous waste spilled in waters with 3 foot waves. The floats should be attached about ⅔ of the way between the bottom and the top so that the arrangement will sit vertically in the water without tipping over.

A plurality of catches and matching latches 605 may be mounted along the edges of the back plane 601 whereby the user may attach a series of the carriers 60 to form a boom.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. The method of removing hazardous fluid waste from a body of water that includes:
   a) providing a flexible mesh carrier having a plurality of cells;
   b) providing a porous bladder filled with sorbent material;
   c) spray coating of said bladder with an adhesive to contain said sorbent material within said bladder:
   d) inserting said porous bladder filled with sorbent material into each of said cells;
   e) introducing said bladder filled, flexible mesh carrier into contact with the hazardous waste near or at the surface of the water body;
   f) allowing absorption of the hazardous waste through the flexible mesh carrier and into the sorbent material within the porous bladder within each said cell; and,
   g) removing said flexible mesh carrier from the body of water, for removal of said bladder from each said cell for disposition of the absorbed hazardous material.

2. The method of removing hazardous fluid waste material from a body of water that includes:
   a) providing a flexible mesh carrier having a plurality of cells accessible through a closeable opening;
   b) providing a porous bladder filled with sorbent material;
   c) spray coating of said bladder with an adhesive to contain said sorbent material within said bladder:
   d) inserting said porous bladder filled with sorbent material into each of said cells through said closeable opening;
   e) closing said opening and introducing said bladder filled, flexible mesh carrier into contact with the hazardous material near or at the surface of the water body;
   f) allowing absorption of the hazardous material through the flexible mesh carrier and into said sorbent material within said porous bladder within each said cell; and,
   g) removing said flexible mesh carrier from the body of water, for removal of said bladder from each said cell for disposition of the absorbed hazardous material.

3. The method of claim 2 including the recharging each of said cells with a dry bladder and re-deploying said flexible mesh carrier.

4. The method of claim 2 wherein the bladder is fabricated of coarse mesh porous material.

5. The method of claim 2 wherein the sorbent material used to fill the bladder is waterfowl feathers.

6. The method of claim 5 wherein said waterfowl feathers consist of duck feathers.

7. The method of removing hazardous fluid waste material from a body of water that includes:
   a) providing a flexible mesh carrier having a plurality of cells accessible through a closeable opening;
   b) providing a porous bladder filled with sorbent material;
   c) spray coating of said bladder with an adhesive to contain said sorbent material within said bladder:
   d) inserting said porous bladder filled with sorbent material into each of said cells through said closeable opening;
   e) closing said opening and introducing said bladder filled, flexible mesh carrier into contact with the hazardous material near or at the surface of the water body;
   f) allowing absorption of the hazardous material through the flexible mesh carrier and into said sorbent material within said porous bladder within each said cell; and,
   g) opening said cell for removal of said bladder from each said cell for disposition of the absorbed hazardous material and refilling said cell with a fresh bladder without removing said carrier from the body of water.

8. A hazardous fluid waste removing apparatus applicable to a body of water to absorb said waste floating near the surface of the water comprising, in combination:
   an elongated sheet of preselected gage mesh folded substantially longitudinally, forming two remote ends and adjacent longitudinal edges, one edge being a fold and the other edge being open;
   seams applied to close at least said remote ends of said folded sheet;
   a preselected plurality of seams applied between said remote ends to form a plurality of cells;
   openable/closeable means mounted on said open longitudinal edges whereby the user may open the portion of said longitudinal edge between adjacent seams to access each of said cells;
   an elongated sheet of preselected gage porous material folded, filled with sorbent material and closed along the open edges to form a bladder; and
   an adhesive coating applied to the outside surface of said sorbent filled bladder whereby the user may removably insert a plurality of said bladders into each of said cells.

9. The apparatus of claim 8 wherein said sorbent material is waterfowl feathers.

10. The apparatus of claim 9 wherein said waterfowl feathers are duck feathers.

11. The apparatus of claim 8 further comprising edges formed in each seam near said fold to form apertures.

12. The apparatus of claim 11 further comprising grommets mounted within said apertures.

13. The apparatus of claim 12 further comprising a preselected length of lead line mounted within said grommets.

14. The apparatus of claim 13 wherein the ends of said lead line are formed into loops which may be used to connect the apparatus into a preselected boom length.

15. The apparatus of claim 8 wherein said bladder is fabricated of biodegradable material.

16. A hazardous fluid waste removing apparatus applicable to a body of water to absorb said waste floating near the surface of the water comprising, in combination:
   an elongated sheet of preselected gage mesh;
   an elongated sheet of non-porous material joined by the longitudinal edges to said sheet of mesh material to form a circular body with remote ends;
   a curtain fabricated of a sheet of non-porous material attached to one of said joined longitudinal edges of said body;
   openable seams applied to close at least said remote ends of said body;
   a preselected plurality of openable seams applied between said remote ends to form a plurality of cells whereby the user may open a seam to access each of said cells;
   an elongated sheet of preselected gage porous material which is folded, filled with sorbent material and closed along the open edges to form a bladder; and,
   an adhesive coating applied to the outside surface of said sorbent filled bladder whereby the user may removably insert a plurality of said bladders into each of said cells.

17. The apparatus of claim 16 further comprising:
   a preselected length of lead line mounted on the edge of said curtain remote from said body.

18. The apparatus of claim 16 further comprising:
   a preselected length of lead line mounted on the mesh of said body thereby increasing the amount of mesh exposed to the surface of said body of water containing hazardous fluid waste material.

19. A hazardous fluid waste removing apparatus applicable to a body of water to absorb said waste floating near the surface of the water comprising, in combination:
   an elongated sheet of preselected gage, rigid mesh forming a back plane;
   a plurality of pairs of panels having a back edge and a front edge, mounted at a preselected angle by said back edge on said back plane to form cells whereby said front edges are spaced apart a preselected distance;
   an elongated sheet of preselected gage porous material folded, filled with sorbent material and closed along the open edges to form a bladder;
   an adhesive coating applied to the outside surface of said sorbent filled bladder whereby the user may removably insert a plurality of said bladders into each of said cells; and,
   floats mounted on said back plane to provide neutral buoyancy to the apparatus full of bladders whereby the apparatus will float in a vertical position with a preselected portion of the apparatus above the surface of the water.

20. The apparatus of claim 19 wherein said sorbent material is waterfowl feathers.

21. The apparatus of claim 20 wherein said waterfowl feathers are duck feathers.

22. The apparatus of claim 19 further comprising:
   a plurality of catches mounted on one vertical edge of said back plane and a corresponding plurality of latches mounted on the other vertical edge of said back plane whereby the user may fasten a plurality of the apparatus units together to form a boom to contain the hazardous waste.

23. The apparatus of claim 19 wherein said bladder is fabricated of biodegradable material.

24. The method of removing hazardous fluid waste from a body of water that includes:
   a) providing a flexible mesh carrier having a plurality of cells;
   b) providing a bladder which is;
      1) a brick of sorbent material being compressed, yet still porous, and formed in a preselected shape adaptable to fit within said cells;
      2) said brick being spray coated with an adhesive to contain said sorbent material within said porous brick;
   c) inserting said bladder filled with sorbent material into each of said cells;
   d) introducing said bladder filled, flexible mesh carrier into contact with the hazardous waste near or at the surface of the water body;
   e) allowing absorption of the hazardous waste through the flexible mesh carrier and into the sorbent material within the porous bladder within each said cell; and,
   f) removing said flexible mesh carrier from the body of water, for removal of said bladder from each said cell for disposition of the absorbed hazardous material.

25. The method of removing hazardous fluid waste material from a body of water that includes:
   a) providing a flexible mesh carrier having a plurality of cells accessible through a closeable opening;
   b) providing a bladder which is;
      1) a brick of sorbent material being compressed, yet still porous, and formed in a preselected shape adaptable to fit within said cells;
      2) said brick being spray coated with an adhesive to contain said sorbent material within said porous brick;
   c) inserting said porous bladder filled with sorbent material into each of said cells through said closeable opening;
   d) closing said opening and introducing said bladder filled, flexible mesh carrier into contact with the hazardous material near or at the surface of the water body;
   e) allowing absorption of the hazardous material through the flexible mesh carrier and into said sorbent material within said porous bladder within each said cell; and,
   f) removing said flexible mesh carrier from the body of water, for removal of said bladder from each said cell for disposition of the absorbed hazardous material.

26. The method of claim 25 including the recharging each of said cells with a dry bladder and redeploying said flexible mesh carrier.

27. The method of claim 25 wherein the sorbent material used to fill the bladder is waterfowl feathers.

28. The method of claim 27 wherein said waterfowl feathers consist of duck feathers.

29. The method of removing hazardous fluid waste material from a body of water that includes:
 a) providing a flexible mesh carrier having a plurality of cells accessible through a closeable opening;
 b) providing a bladder which is;
  1) a brick of sorbent material being compressed, yet still porous, and formed in a preselected shape adaptable to fit within said cells;
  2) said brick being spray coated with an adhesive to contain said sorbent material within said porous brick;
 c) inserting said bladder filled with sorbent material into each of said cells through said closeable opening;
 d) closing said opening and introducing said bladder filled, flexible mesh carrier into contact with the hazardous material near or at the surface of the water body;
 e) allowing absorption of the hazardous material through the flexible mesh carrier and into said sorbent material within said porous bladder within each said cell; and,
 f) opening said cell for removal of said bladder from each said cell for disposition of the absorbed hazardous material and refilling said cell with a fresh bladder without removing said carrier from the body of water.

30. A hazardous fluid waste removing apparatus applicable to a body of water to absorb said waste floating near the surface of the water comprising, in combination:
 an elongated sheet of preselected gage mesh folded substantially longitudinally, forming two remote ends and adjacent longitudinal edges, one edge being a fold and the other edge being open;
 seams applied to close at lest said remote ends of said folded sheet;
 a preselected plurality of seams applied between said remote ends to form a plurality of cells;
 openable/closeable means mounted on said open longitudinal edges whereby the user may open the portion of said longitudinal edge between adjacent seams to access each of said cells;
 a bladder which is;
  1) a brick of sorbent material being compressed, yet still porous, and formed in a preselected shape adaptable to fit within said cells;
  2) said brick being spray coated with an adhesive to contain said sorbent material within said porous brick,
whereby the user may removable insert a plurality of said bladders into each of said cells.

31. The apparatus of claim 30 wherein said sorbent material is waterfowl feathers.

32. The apparatus of claim 31 wherein said waterfowl feathers are duck feathers.

33. A hazardous fluid waste removing apparatus applicable to a body of water to absorb said waste floating near the surface of the water comprising, in combination:
 an elongated sheet of preselected gage mesh;
 an elongated sheet of non-porous material joined by the longitudinal edges to said sheet of mesh material to form a circular body with remote ends;
 a curtain fabricated of a sheet of non-porous material attached to one of said joined longitudinal edges of said body;
 openable seams applied to close at least said remote ends of said body;
 a preselected plurality of openable seams applied between said remote ends to form a plurality of cells whereby the user may open a seam to access each of said cells;
 a bladder which is;
  1) a brick of sorbent material being compressed, yet still porous, and formed in a preselected shape adaptable to fit within said cells;
  2) said brick being spray coated with an adhesive to contain said sorbent material within said porous brick,
whereby the user may removably insert a plurality of said bladders into each of said cells.

34. The apparatus of claim 33 further comprising:
 a preselected length of lead line mounted on the edge of said curtain remote from said body.

35. The apparatus of claim 33 further comprising:
 a preselected length of lead line mounted on the mesh of said body thereby increasing the amount of mesh exposed to the surface of said body of water containing hazardous fluid waste material.

36. A hazardous fluid waste removing apparatus applicable to a body of water to absorb said waste floating near the surface of the water comprising, in combination:
 an elongated sheet of preselected gage, rigid mesh forming a back plane;
 a plurality of pairs of panels having a back edge and a front edge, mounted at a preselected angle by said back edge on said back plane to form cells whereby said front edges are spaced apart a preselected distance;
 a bladder which is;
  1) a brick of sorbent material being compressed, yet still porous, and formed in a preselected shape adaptable to fit within said cells;
  2) said brick being spray coated with an adhesive to contain said sorbent material within said porous brick,
whereby the user may removably insert a plurality of said bladders into each of said cells; and,
 floats mounted on said back plane to provide neutral buoyancy to the apparatus full of bladders whereby the apparatus will float in a vertical position with a preselected portion of the apparatus above the surface of the water.

37. The apparatus of claim 36 wherein said sorbent material is waterfowl feathers.

38. The apparatus of claim 37 wherein said waterfowl feathers are duck feathers.

39. The apparatus of claim 36 further comprising:
 a plurality of catches mounted on one vertical edge of said back plane and a corresponding plurality of latches mounted on the other vertical edge of said back plane whereby the user may fasten a plurality of the apparatus units together to form a boom to contain the hazardous waste.

40. The apparatus of claims 8, 16, 19, 30, 33 or 36 wherein the adhesive is biodegradable.

41. The apparatus of claims 8, 16, 19, 30, 33 or 36 wherein the adhesive is non-biodegradable.

42. The method of claims 1, 2, 7, 24, 25 or 29 wherein the adhesive is biodegradable.

43. The method of claims 1, 2, 7, 24, 25 or 29 wherein the adhesive is non-biodegradable.

\* \* \* \* \*